INVENTORS
PAUL FAHLENBERG
RUDOLF LANG

BY *Larson and Taylor*

ATTORNEYS

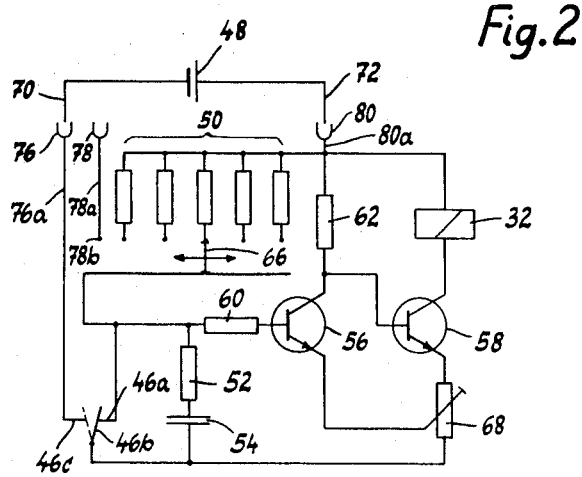
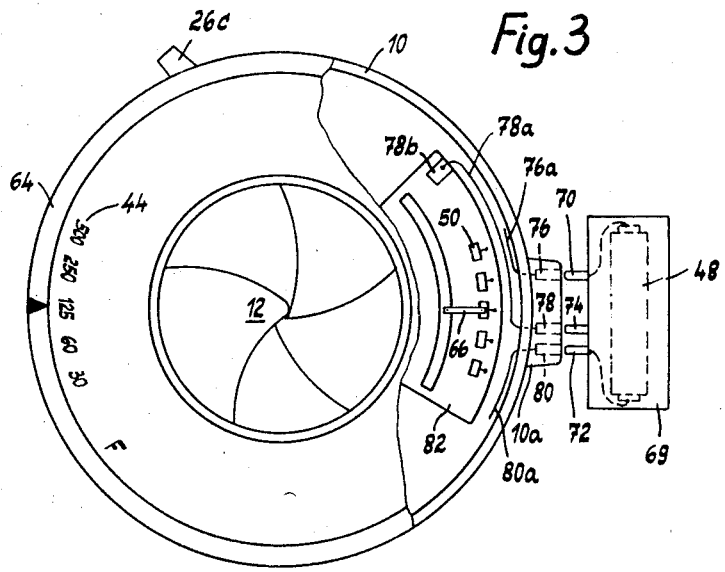

April 21, 1970   P. FAHLENBERG ETAL   3,507,201
PHOTOGRAPHIC SHUTTER
Filed Oct. 14, 1966   4 Sheets-Sheet 3
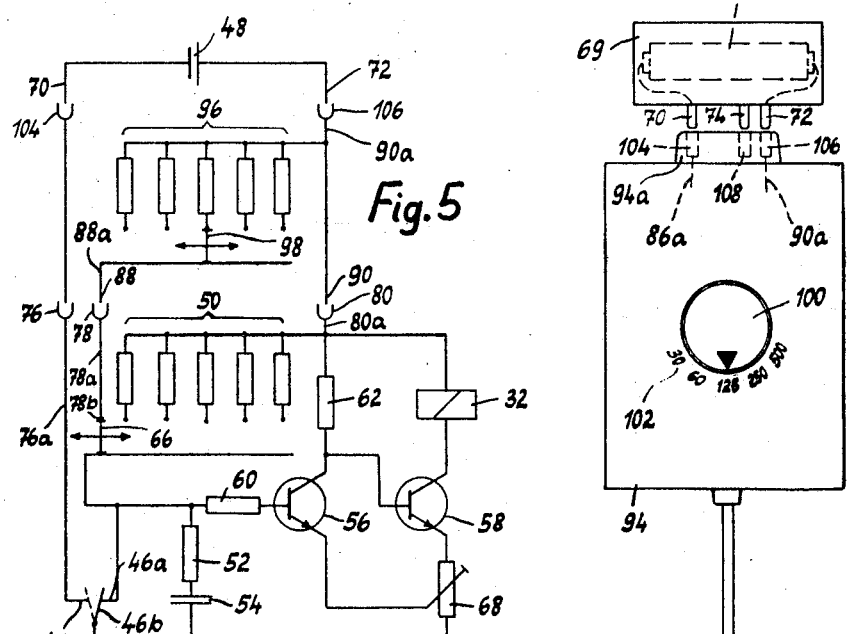
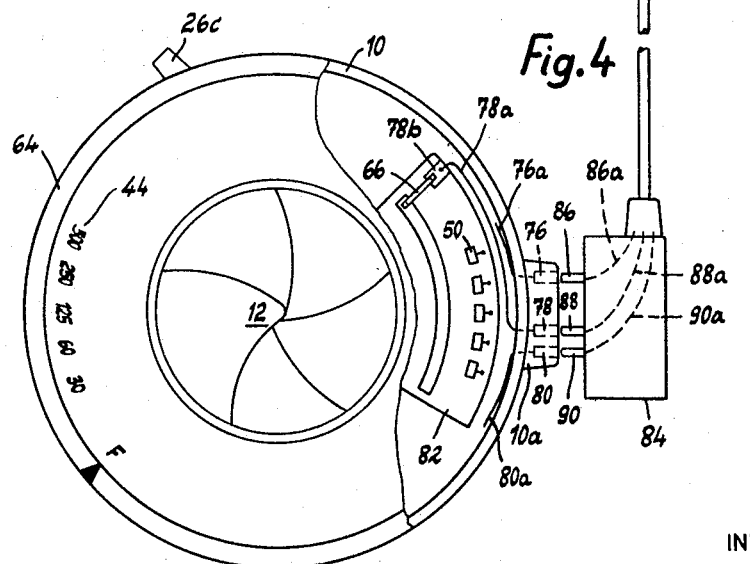
INVENTORS
PAUL FAHLENBERG
RUDOLF LANG
BY *Larson and Taylor*
ATTORNEYS

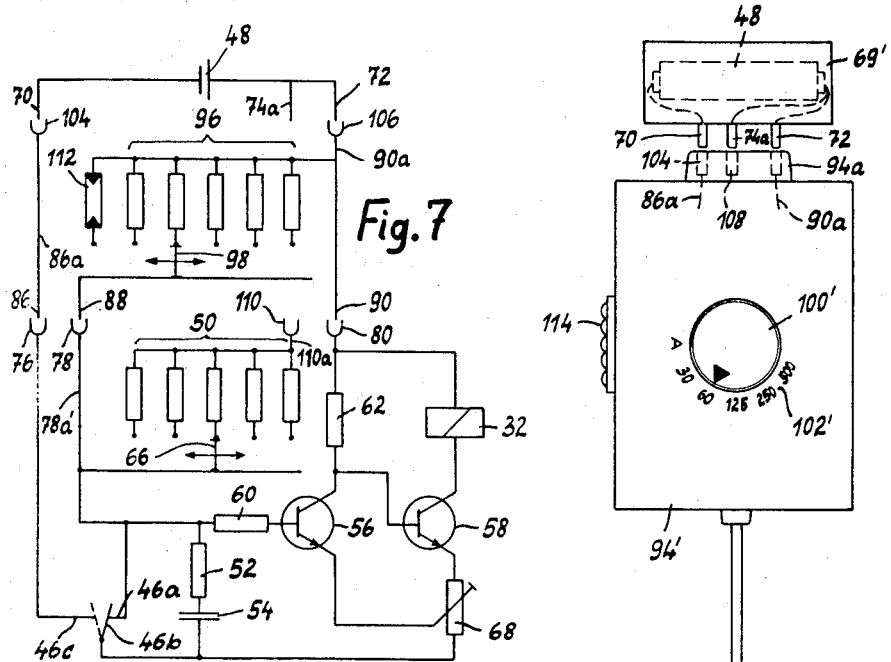
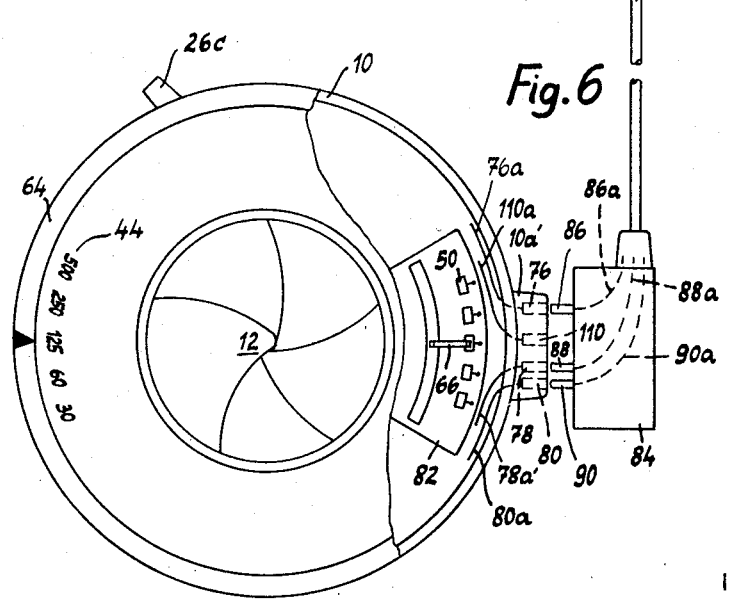

United States Patent Office 3,507,201
Patented Apr. 21, 1970

3,507,201
PHOTOGRAPHIC SHUTTER
Paul Fahlenberg, Baierbrunn, near Munich, and Rudolf Lang, Grafing, near Munich, Germany, assignors to Compur-Werk Gesellschaft mit beschrankter Haftung & Company
Filed Oct. 14, 1966, Ser. No. 586,760
Claims priority, application Germany, Oct. 21, 1965, C 37,221
Int. Cl. G03b 9/00
U.S. Cl. 95—53      10 Claims

ABSTRACT OF THE DISCLOSURE

A photographic shutter apparatus coupled with an electrical circuit for controlling the exposure period. The circuit can be connected and controlled by either, (a) A first variable resistance mounted in the shutter housing or (b) A second variable resistance remote from the housing which can be plugged in to the shutter timing circuit.

---

This invention relates to photographic apparatus, and in particular it relates to an improved photographic shutter of the type having an electrical arrangement for regulating the duration of the exposure period, including a period-determining RC-member installed in the shutter housing, which member is adjustable by means of a manually operable dial mounted on the shutter housing.

When using cameras equipped with shutters of this character it is frequently desirable not only to set the exposure period by direct operation of the manual dial mounted on the shutter housing, but also, in certain instances, for example in the case of technical photographs, to regulate the exposure period from a location remote from the shutter itself.

Thus, it is a purpose of the present invention to provide a shutter of the type referred to in which setting of the exposure period may be accomplished both by direct operation and by remote operation but which shutter has a minimum number of auxiliary parts and requires a minimum number of manipulative steps for changing over the shutter from one type of operation to another.

This purpose is achieved, in accordance with the present invention, by constructing the regulating resistance located within the shutter housing in such a manner that it can be disconnected from the remainder of the electrical circuitry in the shutter housing, while an additional regulating resistance, mounted in a switch box separate from the shutter housing, can then be electrically connected to the remaining elements of the electrical circuit within the shutter housing.

It is normal to mount the battery, which is associated with the electrical arrangement, in a special container which is adapted to be connected to the electrical elements within the shutter by means of a plug-in coupling. In accordance with a further feature of the present invention, however, the shutter housing plug-in coupling can be used, in the alternative, for receiving connecting conductors from the switch box. In accordance with a further feature of the present invention the switch box itself is also equipped with a plug-in coupling by means of which the battery container can be attached to the switch box for connecting the battery to both the regulating resistances within the switch box and the remainder of the electrical arrangement located within the shutter housing. In this way it is possible to use a single battery for both setting methods, direct and remote, thereby reducing still further the number of required auxiliary elements.

The regulating resistance referred to above may comprise any type of variable resistance device such as for example, a potentiometer, a plurality of separate resistance elements, any one of which can be connected through a sliding member to the electrical circuit, or a photosenstitive device. In a preferred embodiment of the invention, however, the plurality of separate resistances with a slidable member is employed within the shutter housing while either the plurality of separate resistances or a photosensitive variable resistance device is employed within the switch box for remote operation. Also, the photosensitive variable resistance element can be mounted within the switch box in such a manner that it can be connected to the electrical circuit through the same sliding mechanism which is employed to select a given one of the separate resistance elements.

With the arrangement of the present invention the duration of the exposure period can be regulated by at least the following modes of operation. First, by direct manual operation of the dial located on the shutter housing. Secondly, by remote control by operating a knob located on the switch box for controlling the regulating resistance located therein. Variation of the resistance can be accomplished either by choosing one of the selected plurality of resistance elements or by employing the variable resistance photosensitive device. Further, disconnecting the regulating resistance within the shutter housing and substituting therefore the regulating resistance located within the switch box can be accomplished in one of two ways. First, it can be accomplished by moving the dial on the shutter housing to a limit position whereat the regulating resistance within the shutter housing is disconnected while the regulating resistance within the switch box is connected. Also, it is possible to design the various plug-in couplings in such a manner that the plugging the battery into the shutter housing will necessarily cause the regulating resistance within the shutter housing to be connected while connecting the switch box to the shutter housing (and connecting the battery to the switch box) will necessarily cause the regulating resistance within the switch box to be connected to the remaining elements of the electrical circuit while the regulating resistance located within the shutter housing is cut out.

Thus, it is an object of this invention to provide an improved electrically operated shutter device.

It is another object of this invention to provide an electrically operable photographic shutter device capable of both direct and remote operation and requiring a minimal number of auxiliary elements.

It is still another object of this invention to provide an improved electrically operable photographic shutter device capable of both direct and remote operation wherein the manipulative steps necessary for converting the shutter device from one mode operation to another are minimized.

Other objects and the attendant advantages of the present invention will become apparent from the detailed description to follow of preferred embodiments of the invention together with the accompanying drawings in which:

FIGURE 2 is a circuit diagram of the electrical regulating arrangement shown in FIGURE 1.

FIGURE 3 is an illustration of the blade shutter and showing the battery container adapter to be mounted thereon.

FIGURE 4 illustrates the blade shutter together with a switch box adapted to be mounted thereon for remote operation.

FIGURE 5 is a circuit diagram of the arrangement shown in FIGURE 4.

FIGURE 6 shows the blade shutter together with a modified switch box for remote control operation.

FIGURE 7 is a circuit diagram of the arrangement shown in FIGURE 6.

Figure 1:
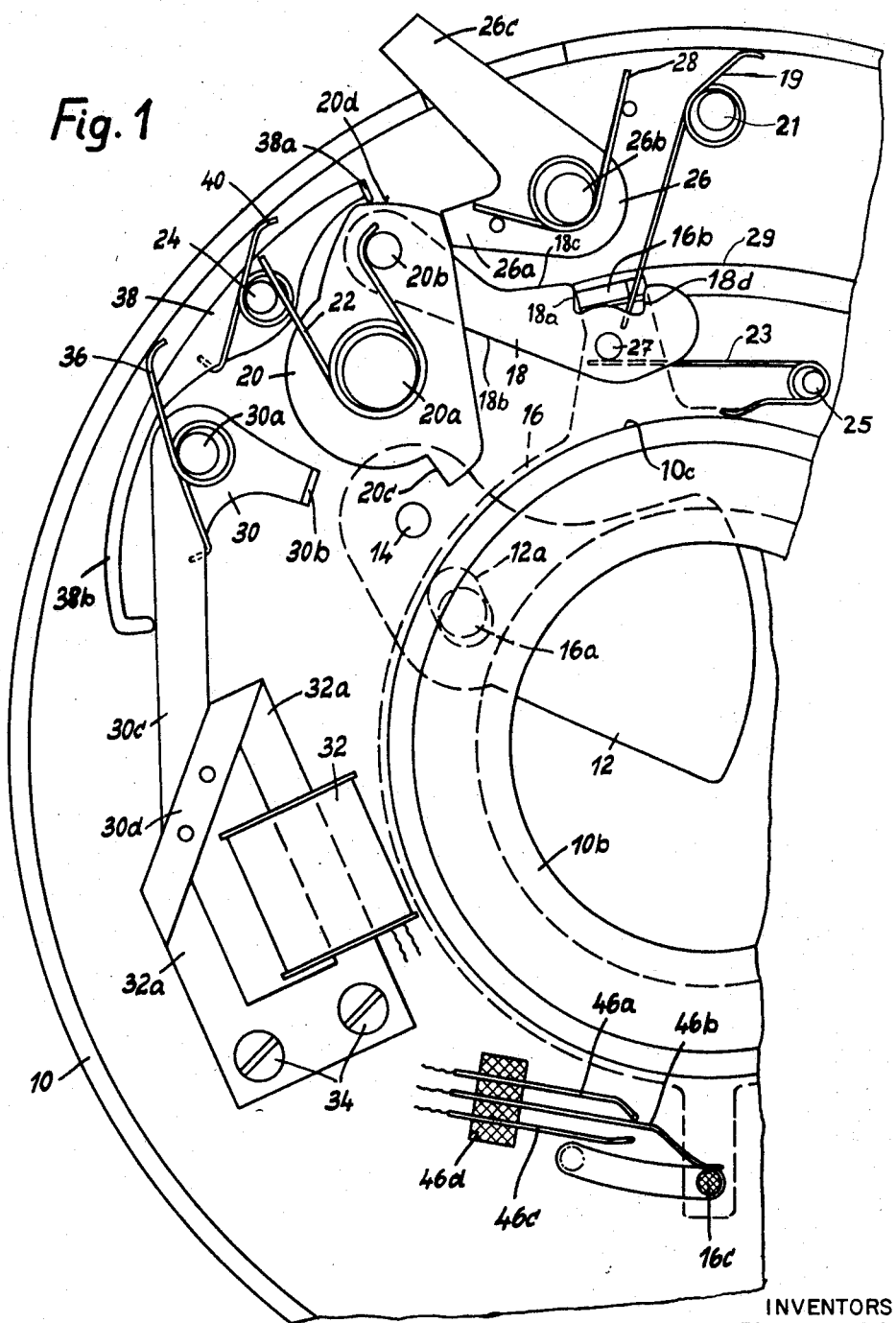
FIGURE 1 is a partial view on an enlarged scale of the driving arrangement for a blade shutter provided with an electrical regulating arrangement, and showing the driving arrangement in the shutter-closed cocked position.

The shutter illustrated in FIGURE 1 is a cocking type shutter having a plurality of blades 12 rotatably mounted around associated pivot pins 14 in housing 10. Each blade 12 has a control slot 12a, in which a pin 16a of a blade driving ring 16 engages. Said ring is mounted so as to be rotatable around the objective tube 10b of the shutter. A lug 16b of ring 16 projects through slot 29 and cooperates with a crank 18, which is articulated at one end to a main driving member 20. The crank 18 is urged towards lug 16b by spring 23 mounted on pin 25 in the shutter housing and acting against a pin 27 attached to the crank arm. The lug 16b is urged towards the shutter closed position (as shown in FIGURE 1) by a spring 19 attached to the shutter housing at pin 21. The lug 18 has four cam surfaces, 18a, 18b, 18c and 18d the purposes of which will be described in greater detail below.

A shaft 20a of the main driving member 20, projecting from the shutter housing 10, is turnable by means not shown to cock the member 20 by loading the driving spring 22 thereof, which spring is anchored at one end to pin 24 and at the other end presses against a pin 20b on the member 20.

The main driving member, as shown in its cocked position of FIGURE 1, is held by an arm 26a of a trip 26, which is mounted on pin 26b in the shutter housing 10 and has an arm 26c projecting from the latter. A return spring 28 biases the trip 26 in the counter clockwise direction. A further locking lever 30 made from an electrically insulating material is associated with the main driving member 20 and is rotatably mounted about pin 30a in the shutter housing 10 in such a way that its arm 30b projects into the rundown path of a nose 20c on the main driving member 20. A metallic armature 30d is fastened on the second arm 30c of the lever 30 and co-operates with a U-shaped magnetic core 32a of an electromagnet, the winding 32 of which is connected to a circuit of an electrical regulating arrangement to be described in detail below. The magnetic core 32a is fastened in the shutter housing 10 by screws 34, with the interposition of suitable electrical insulating means. Preferably this screw fastening is designed to be adjustable, in order that the required position of the magnetic core in relation to the armature can be easily set and secured during assembly. A torsion spring 36 biases the lever 30 in the clockwise direction about pin 30a.

A double armed actuating lever 38 is pivotally mounted on the pin 24 and is biassed in the clockwise direction by a spring 40. One arm 38a of the actuating lever cooperates with a control cam surface 20d on the periphery of the main driving member 20, whilst the other arm 38b attempts to press the armature 30d against the magnetic core 32a through the arm 30c. The arm 38b moreover is resiliently designed so that, during cocking, the over travel caused by the control cam surface 20d of the main driving member 20 (that is, the counter clockwise movement of 38a after the arm 38b has turned counter clockwise enough to urge armature 30d against core 32a) can be compensated by in the inherent resilience of the arm 38b.

A changeover switch having spring contacts 46a, 46b, 46c, is fastened in the shutter housing 10 in an insulating piece 46d. This changeover switch is connected in the power supply of the electrical regulating arrangement, the contact spring 46b being engageable with either the contact spring 46a or spring 46c through the action of an insulating pin 16c on the blade driving ring 16.

The mechanical shutter apparatus described above operates together with a battery and an RC circuit on the principle that the main driving member 20 shall be located in the shutter-open position by the locking lever 30, carrying the magnetic armature 30d, when the magnetic winding 32 is energized and, that the period for which the magnetic winding is energized (and thus the exposure period of the shutter) shall be determined by selecting a regulating resistance of a certain value in the RC circuit.

FIGURE 2 illustrates the connections of the regulating arrangement. Current is fed from a battery 48 which charges the period-determining condenser 54 through an adjustable electrical resistance 50 and a limiting resistance 52. The electrical connections also include transistors 56 and 58, a protective resistance 60, a collecting resistance 62 and a magnetic winding 32. A setting potentiometer for adjusting the control period in the regulating arrangement is designated 68. The changeover switch 46a, b, c described above is incorporated in the regulating arrangement in the manner illustrated in FIGURE 2.

It is also noted that the manual dial setter 64, which is adjustable in relation to a fixed scale 44 indicating the exposure periods, and is mounted at the front side of the shutter, carries the slider 66 associated with resistance 50.

Battery 48 is accommodated in a special battery container 69 (FIGURE 3) this having two contact pins 70, 72 and a non-conducting locating pin 74. Provided at the periphery of the shutter housing 10 is an insulating body 10a with three plug-in sockets 76, 78, 80 connected to conductors 76a, 78a and 80a. The connection of these conductors is seen in the diagram of FIGURE 2. The end of conductor 78a is connected to a contact strip 78b disposed beside the resistance 50 and adapted to be connected to the slider 66.

With the exception of the battery 48, all the remainder of the electrical elements, including the connecting conductors, shown in the wiring diagram of FIGURE 2 are installed within the housing 10 where, for example, they are disposed on a plate-like support 82 of insulating material which is fastened within the shutter housing 10.

FIGURES 4 and 5 illustrate one embodiment of an arrangement to be used for remote control of the exposure period. A three-pole plug 84 with contact pins 86, 88, 90 is also adapted to be connected with the plug-in sockets 76, 78, 80 in the shutter housing 10 in place of the battery container 69, this plug 84 being connected through a cable 92 with a switch box 94. Installed in this switch box is an additional regulating resistance 96 which corresponds exactly to the regulating resistance 50 as far as the resistance dimensions are concerned. A slider 98 of the resistance 96 is connected to a setting knob 100 provided on the switch box which cooperates with an exposure period scale 102. Mounted at the narrow side of the switch box 94 is an insulating body 94a with plug-in sockets 104, 106 and a locating hole 108. The socket 104 is connected to conductor 86a and socket 106 to the conductor 90a (FIGURE 5).

FIGURES 6 and 7 illustrate a further embodiment of the invention. It differs from the previously-described arrangements in that it provides a different method for switching out the regulating resistance 50. In other respects the electrical regulating arrangement functions in the same way as that described in connection with FIGURES 2 to 5. In addition to the plug sockets 76, 78, 80 already described, a further plug socket 110 is provided in the insulating body 10a' of the shutter housing 10, the conductor 110a of this socket 110 leading directly to regulating resistance 50. The third pin 74a on the battery container 69' is now also made conductive and is connected to the same pole of the battery as the contact pin 72.

In addition to the regulating resistance 96 there is provided in the switch box 94' a photosensitive variable resistance 112 (CdS-resistance) which receives light from the photographic subject through an incident window 114 at the narrow side of the switch box 94'. By setting the knob 100' to "A" the photo resistance 112 can be connected to the contact pin 88 through slider 98, instead of the regulating resistance 96.

The arrangement shown in FIGURES 1, 2 and 3 operates as follows.

In this case the battery container 69 is to be attached directly to the shutter housing 10 with the assistance of the plug-in coupling 70, 72, 74 (FIGURES 2 and 3).

It is assumed that in the position illustrated in FIGURES 1 to 3 the shutter is cocked and the battery 48 is connected to the regulating arrangement through contacts 48a and 48b. The operating cam surface 20d of the main driving member 20 adjusts the actuating lever 38 in such a way that its arm 30c urges the armature 30d against the holding magnet 32a. At this time there is however no current in the magnetic winding 32.

If the trip 26 is now operated, the main driving member 20, thereby released, begins to turn clockwise under the force of spring 22, as a result of which the blade ring 16 is driven in the clockwise direction by cam surface 18a of crank 18 acting on lug 16b, to open the blades 12. Immediately upon commencement of the blade ring movement, the pin 16c of the blade driving ring 16 moves the switch 46b from 46a to 46c, thereby connecting the battery 48 to the electrical regulating system. The emitter conductor of both transistors 56, 58 are connected to the battery 48 and the short circuit of the period-determining condenser 54 is broken. Since the base of the transistor 56 has applied thereto its emitter potential determined by transistor 58, the transistor 56 is completely blocked at the moment contact is made so that the base of transistor 58 is connected to battery 48 through resistance 62. The collector current which now flows through transistor 58 energizes the holding magnet 32a through winding 32, whereby the armature 30d is held by the full power of the holding magnet after only a short space of time following the extent at which the switchover takes place. The control cam surface 20d of of the main driving member 20 prevents the armature 30 moving away from magnet 32a under the action of spring 40 during the few moments following release of driving member 20 but preceding the energization of magnet 32a.

When the blades 12 are fully open, the nose 20c of member 20 will strike the arm 30b of the locking lever 30 which is held by armature 30d, and will be arrested in this position for the period that the holding magnet is energized. In this position the cam surface 18a holds lug 16b to the shutter-open position.

When the switch 46b is changed over from 46a to 46c a charging current begins to flow through resistance 50 into the condenser 54, and this continues until the base of the transistor 56 exceeds its emitter voltage. When this happens the transistor 56 starts to become conductive and there is a small voltage drop at the resistance 62. The conductive capacity of the transistor 58 as a result diminishes to a small degree, as a result of which the voltage drop at the potentiometer 68 also falls because the actuating current of the primary transistor 56 is less than the amplification factor of the two transistors and has no effect on the potentiometer 68. As a result of this the emitter voltage of the transistor 56 is reduced and the voltage difference between the base and emitter 56 increases, especially as the voltage at condenser 54 further increases in the interim. The now increased current flow at transistor 56 is however effective through the feed back connection described above, so that there is a surge increase of current in the transistor 56, whilst that in the transistor 58 drops equally abruptly. The transistor 56 thus becomes conductive whilst the transistor 58 is blocked.

As soon as the current flow ceases in transistor 58, it also stops in the winding 32 and the holding magnet 32a is de-energized. The spring 36 can now move the locking lever 30 in the clockwise direction and thus remove arm 30b from latching engagement with the nose 20c of the main driving member 20. This member 20, now freed, will then continue to turn in the clockwise direction under the influence of spring 22 to a rest position and the blade driving ring 16 moves counter clockwise (shutter-closed position) under the influence of cam surface 18d acting on lug 16b. Consequently, the exposure procedure is terminated after a period set at resistance 50. When the blade driving ring 16 returns into the rest position (which is, of course, identical with its cocked position according to FIGURE 1) the pin 16c of the switch 46b is re-applied against 46a, as a result of which the current feed to the emitter conductor of both transistors 56, 58 is interrupted and discharge of condensers 54 through resistance 52 is brought about. The shutter is then reset by turning member 20 counter clockwise by a cocking means (not shown) until member 20 is held by arm 26a.

The remote control operation employing the embodiment shown in FIGURES 4 and 5 is as follows.

In this case the hand dial 64 of the shutter has to be moved to the limit position "F" so that its slider 46 engages the contact strip 78b. The regulating resistance 50 at the shutter is thus switched out. The battery container 69 is to be placed on the switch box 94 and the plug 84 introduced into the socket 76, 78, 80 of the shutter. By this means the additional regulating resistance 96 is connected to the electrical arrangement within the shutter in place of the disconnected regulating resistance 50. The exposure period of the shutter can now be set remotely by operating the setting knob and the slide 98 connected thereto.

In other respects the electrical regulating arrangement operates in the same way as has been described in connection with FIGURES 1–3.

The embodiment shown in FIGURES 6 and 7 is capable of at least the following three modes of operation.

First, direct manual setting at the shutter is possible. In this case the battery container 69' is to be mounted directly on the shutter housing 10 at 10a, so that the contact pin 70 is inserted in the socket 76, contact pin 74a in the socket 110, and contact pin 72 in socket 80. In this case there is no plug to enter the socket 78 and consequently its conductor 78a' is not employed in the circuit. The regulating resistance 50 is consequently applied to the battery 48 through plug 110 and the exposure period can be set directly at the shutter by operating the hand dial 64 with its slider 66.

Secondly, manual remote control of the shutter is possible.

As illustrated in FIGURES 6 and 7, in this instance the battery container 69' is to be connected to the switch box 94' and the plug 84 thereof to the shutter housing 10 at 10a'. Since the socket 110 is then disconnected from the circuit, the resistance 50 is automatically cut out, irrespective of the position occupied by its slider 66. Consequently movement of the hand setter 64 to the limit position "F" is here dispensed with. Only the resistance 96 is in use and this can again be adjusted by means of the setting knob 100' within the range of scale 102'.

Finally, automatic remote control of the shutter is as follows. In this case the arrangement of the switch box and battery casing is as shown in FIGURES 6 and 7 with the sole difference that the setting knob 100' is to be moved to the mark "A" provided beside scale 102'. This will cause the slider 98 to bring the photosensitive variable resistance element 112 into use in place of the regulating resistance 96. Of course the window 114 is to be turned towards the photographic subject. The exposure period is now controlled by means of the electrical regulating arrangement in the shutter through the resistance value of the photosensitive variable resistance 112 which in known fashion varies automatically with the brightness of the photographic subject.

The invention has been described above in detail with respect to several preferred embodiments thereof. However, it should be apparent that many modifications and variations are possible within the spirit and scope of the invention which is defined by the appended claims.

We claim:
1. In a photographic shutter device of the type including an electrical circuit for controlling the exposure period, said electrical circuit mounted in the shutter housing and including a first variable resistance means for determining the duration of the exposure period, the improvement wherein:
   (1) said electrical cilrcuit is adapted to be controlled in a first condition by a first control means mounted on the shutter housing and connected to the said first variable resistance means, and
   (2) said shutter includes a means for electrically disconnecting the electrical circuit from the first variable resistance means and electrically connecting the electrical circuit to a second variable resistance means remote from the shutter housing for determining the duration of the exposure period, and said electrical circuit is adapted to be controlled in a second condition by means remote from the said shutter housing and connected to the second variable resistance means.

2. A photographic shutter device as claimed in claim 1 wherein said shutter housing includes a first electrical coupling, and said second variable resistance means includes a second electrical coupling, and wherein said device further includes a power source means for delivering electrical energy to said electrical circuit, said power source means having a third electrical coupling, said first electrical coupling being onstructed to be connected to the said third electrical coupling in the said first condition and with the said second electrical coupling in the said second condition.

3. A photographic shutter device as claimed in claim 2 wherein said second variable resistance means has a fourth electrical coupling, which is constructed to be connected to the said third electrical coupling in the said second condition for delivering electrical energy through the said second variable resistance means to the said shutter device.

4. A photographic shutter device as claimed in claim 2 wherein the said means for electrically disconnecting the first resistance means from the electrical circuit is connected to and operated by the said first control means.

5. A photographic shutter device as claimed in claim 2 wherein the said means for electrically disconnecting the said first resistance from the said electrical circuit is operative to cut off the flow of electrical energy from said power source to said first resistance upon connection of the said first and second coupling.

6. A photographic shutter device as claimed in claim 2 wherein said second variable resistance means is mounted in a switch housing separate from said shutter housing and includes a slider and a manually operable knob connected to said slider whereby movement of the knob moves the slider to vary the resistance of the second variable resistance means.

7. A photographic shutter device as claimed in claim 6 wherein said second variable resistance means includes a photo-resistance also mounted within said switch housing and made operable by movement of said knob.

8. A photographic shutter device as claimed in claim 6 wherein said first control means includes a manually operable means mounted on said shutter housing and said first variable resistance means includes a slider movable by movement of said manually operable means.

9. A photographic shutter device as claimed in claim 2 wherein said second variable resistance means is a photosensitive variable resistance means.

10. A photographic shutter device as claimed in claim 1 wherein said first control means includes a manually operable means mounted on said shutter housing and said first variable resistance means includes a slider movable by movement of said manually operable means.

References Cited

UNITED STATES PATENTS 3,065,387 11/1962 Dean _____ 95—53 XR
3,348,460 10/1967 Schmitt _____ 95—53 XR NORTON ANSHER, Primary Examiner L. H. McCORMICK, Jr., Assistant Examiner U.S. Cl. X.R.

95—10